H. H. DUDLEY.
FISH PLATE.
APPLICATION FILED MAY 24, 1912.
1,066,002.
Patented July 1, 1913.
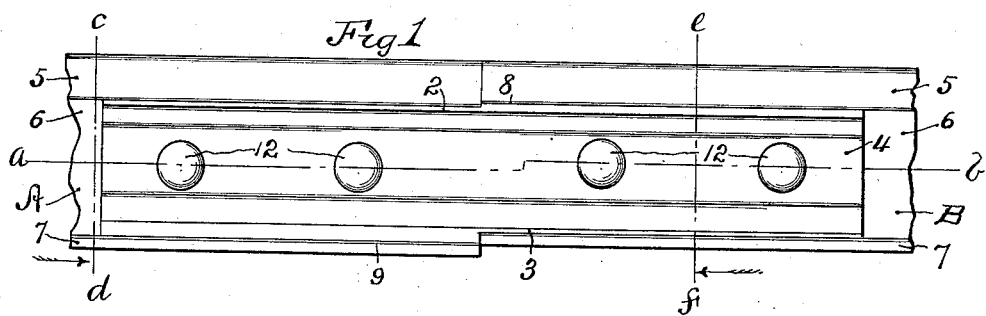
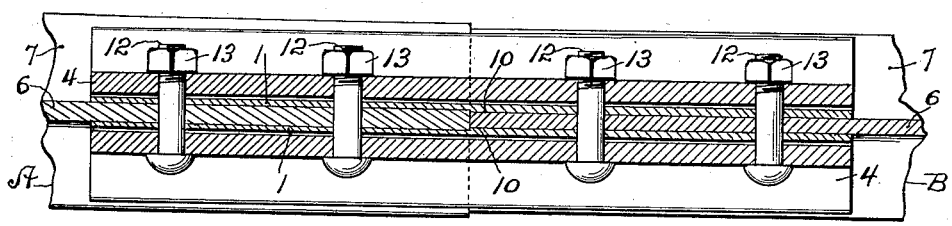
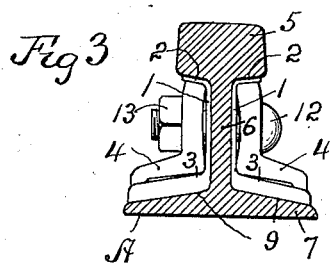 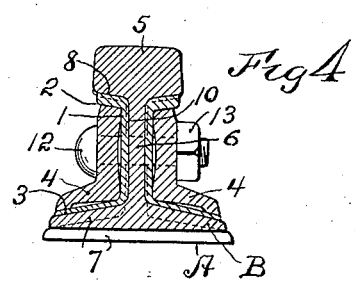
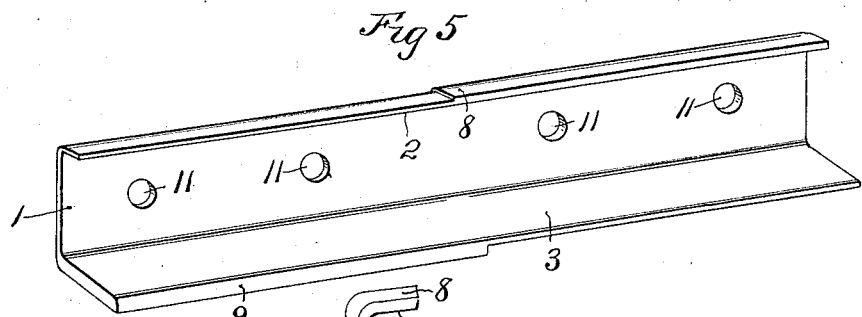
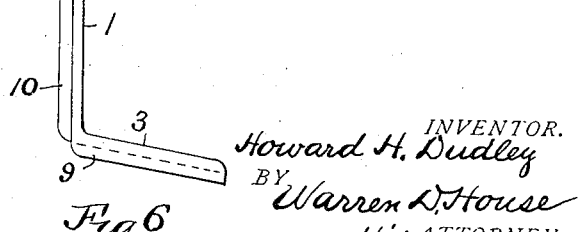
WITNESSES:
R. Hamilton
E. B. House
INVENTOR.
Howard H. Dudley
BY Warren D. House
His ATTORNEY.

UNITED STATES PATENT OFFICE.

HOWARD H. DUDLEY, OF KANSAS CITY, MISSOURI.

FISH-PLATE.

1,066,002.  Specification of Letters Patent.  Patented July 1, 1913.

Application filed May 24, 1912. Serial No. 699,502.

*To all whom it may concern:*

Be it known that I, HOWARD H. DUDLEY, a citizen of the United States, and a resident of Kansas City, in the county of Jackson and State of Missouri, have invented a certain new and useful Improvement in Fish-Plates, of which the following is a specification.

My invention relates to improvements in fish plates.

The object of my invention is to provide a fish plate which, when employed at a joint between rails of different sizes, will retain the top surfaces of the rail heads flush with each other.

My invention is further adapted for use in connection with ordinary fish plates, in which case my improved fish plate serves as a filler which will give a flat even surface for the fish plate to bear against, although the rails of the joint are of different height and thickness.

Other novel features of my invention are hereinafter fully described and claimed.

In the accompanying drawing which illustrates the preferred form of my invention, Figure 1 is a side elevation of a rail joint in which my invention is employed, the rails being of different height and thickness, and the ordinary angle fish plates being also employed. Fig. 2 is a horizontal section on the line *a—b* of Fig. 1. Fig. 3 is a cross section on the line *c—d* of Fig. 1. Fig. 4 is a cross section on the line *e—f* of Fig. 1. Fig. 5 is a perspective view of my improved fish plate. Fig. 6 is an end view of my improved fish plate.

Similar characters of reference designate similar parts.

Preferably my improved fish plate is of channel shape, as is shown in the drawing. The inner sides of the web 1, upper flange 2 and lower flange 3 are preferably even surfaces, thereby providing flat bearing surfaces for the ordinary angle fish plates 4.

A and B respectively designate the end portions of two rails of different height and thickness, and the head, web and base of each rail is designated respectively by 5, 6 and 7. It is desirable to have the tops of the heads 5 of the rails A and B flush with each other, as is shown in Fig. 1. As the head 5 of the smaller rail B is of less depth than the head of the rail A, the upper side of the improved fish plate, which, in the channel form, shown in the drawings, is the outer side of the flange 2, has that portion below the head 5 of the rail B located in a different and higher horizontal plane than the portion underlying the rail A, thereby providing a projecting portion 8 which fills the gap which would otherwise occur between the lower side of the head and the outer side of the flange 2. As the rail base 7 of the rail B is also higher than the base of the rail A, the outer side of the flange 3, at the left of a plane extending transversely to the fish plate where the ends of the rails A and B meet, as viewed in Fig. 1, is in a lower horizontal plane than the portion of the flange 3 which is over the base 7 of the rail B, thereby providing a projecting portion 9 at the under side of the flange 3 which fills in the gap, which would otherwise be present between the bottom of the flange 3 and the top of the base 7 of rail A.

As the webs 6 of rails A and B are of different thicknesses, the outer side of the web 1 which is opposite the web 6 of the rail B is provided opposite the rail B with a portion which is in a different plane from the remaining outer portion of said web 1, thereby providing a projecting portion 10 which fills in the gap which would otherwise occur between the web 6 of the rail B and the web 1.

The web 1 is provided with holes 11 to receive the usual bolts 12 which are provided with nuts 13.

In operating my invention, two improved fish plates of my invention are provided at each rail joint where rails of different sizes are employed, the fish plates being disposed at opposite sides of the rails with the webs 1 lying against the webs 6 of the rails A and B, the projecting portion 8 of each fish plate being under the head 5 of rail B, the projecting portion 10 against the web 6 of the rail B, and the projecting portion 9 being over the base 7 of rail A. The angle bars or fish plates 4 are then mounted respectively in the channels of the improved fish plates, and bear at their upper and lower edges against the inner sides respectively of the flanges 2 and 3. The bolts 12 are then inserted through the angle plates 4, holes 11 and through the webs 6 of the rails, the nuts 13 being mounted, as usual to bear against one of the angle plates 4, the heads of the bolts bearing against the other angle plate 4. When the parts are assembled as above described, a firm joint will be afforded and the tops of the rails A and B will be retained flush with each other.

I do not limit my invention to the specific structure described and illustrated, as modifications within the scope of the appended claims, may be made without departing from the spirit of my invention.

Having thus described my invention, what I claim and desire to secure by Letters Patent, is:—

1. A channel fish plate one flange of which has an even inner surface, a portion of the outer side of said flange being located in a plane different from the plane of the remaining portion of the outer side of said flange.

2. A channel fish plate each flange of which has an even inner surface, a portion of the outer side of each flange being located in a plane different from the plane of the remaining portion of the outer side of said flange.

3. A channel fish plate having a portion of the outer side of the web located in a plane different from the remaining portion of the outer side of the web, and forming a projecting portion, a portion of the outer side of one flange being located in a plane different from the remaining portion of the outer side of said flange and forming a projecting portion, the said projecting flange and web portions being located between one end of the fish plate and a plane transverse to the fish plate, said flange and web having each an even inner surface.

4. A channel fish plate having a portion of the outer side of the web located in a different plane from the remaining portion of the outer side of the web and forming a projecting portion, a portion of the outer side of one flange being located in a plane different from the remaining portion of the outer side of said flange and forming a projecting portion, said projecting portions being at opposite sides of a plane transverse to said fish plate, and the inner sides of said flange and web being even surfaces.

5. A channel fish plate having a portion of the outer side of the web located in a plane different from the remaining portion of the outer side of the web and forming a projecting portion, a portion of the outer side of each flange being located in a plane different from the remaining portion of the outer side of said flange and forming a projecting portion, the projecting portion of one flange and the projecting portion of the web being located at the same side of a plane transverse to the fish plate, and the projecting portion of the other flange being at the other side of said transverse plane, the web and each of said flanges having an even inner surface.

In testimony whereof I have signed my name to this specification in the presence of two subscribing witnesses.

HOWARD H. DUDLEY.

Witnesses:
WARREN D. HOUSE,
E. B. HOUSE.

Copies of this patent may be obtained for five cents each, by addressing the "Commissioner of Patents, Washington, D. C."